United States Patent [19]

Bergmans et al.

[11] Patent Number: 4,870,657
[45] Date of Patent: Sep. 26, 1989

[54] DATA SIGNAL TRANSMISSION SYSTEM USING DECISION FEEDBACK EQUALIZATION

[75] Inventors: Johannes W. M. Bergmans, Tokyo, Japan; Petrus J. van Gerwen; Kornelis J. Wouda, both of Eindhoven, Netherlands

[73] Assignee: U.S. Philips Corp., New York, N.Y.

[21] Appl. No.: 204,141

[22] Filed: Jun. 8, 1988

[30] Foreign Application Priority Data

Jun. 9, 1987 [NL] Netherlands ............. 8701332

[51] Int. Cl.[4] ............................................. H04B 3/14
[52] U.S. Cl. ........................................ 375/14; 375/99
[58] Field of Search ............... 375/12, 14, 18, 94, 375/99, 101, 103; 333/18; 328/164; 370/6

[56] References Cited

U.S. PATENT DOCUMENTS

| | | | |
|---|---|---|---|
| 4,389,727 | 6/1983 | Rouffet | 375/14 |
| 4,404,600 | 9/1983 | Murakami | 375/14 |
| 4,577,329 | 3/1986 | Brie et al. | 375/14 |
| 4,701,936 | 10/1987 | Clark et al. | 375/14 |

*Primary Examiner*—Benedict V. Safourek
*Attorney, Agent, or Firm*—Emmanuel J. Lobato

[57] ABSTRACT

A system for transmitting a data signal ($a_k$) at a given symbol rate 1/T comprises a data transmitter (1), a channel (3(1)) of a transmission facility (3) having a plurality of channels (3(1)-3(M)), and a data receiver (2) with an equalizer (7) of the decision feedback type. This equalizer comprises a feedback filter (12) with a memory span NT and a feedforward filter (8) which includes a low-pass filter section having a substantially minimum-phase character and an amplitude-frequency characteristic $|W(f)|$ which has a pronounced maximum $|W(f_m)|$ for a frequency $f_m$ near to the frequency $f=1/((N+1)T)$ and which is decreasing for frequencies exceeding $f_m$ [FIG. 5A]. Consequently, with respect to conventional dimensionings of the equalizer (7), this achieves an improved transmission quality and/or a reduced complexity of the feedback filter (12).

6 Claims, 6 Drawing Sheets

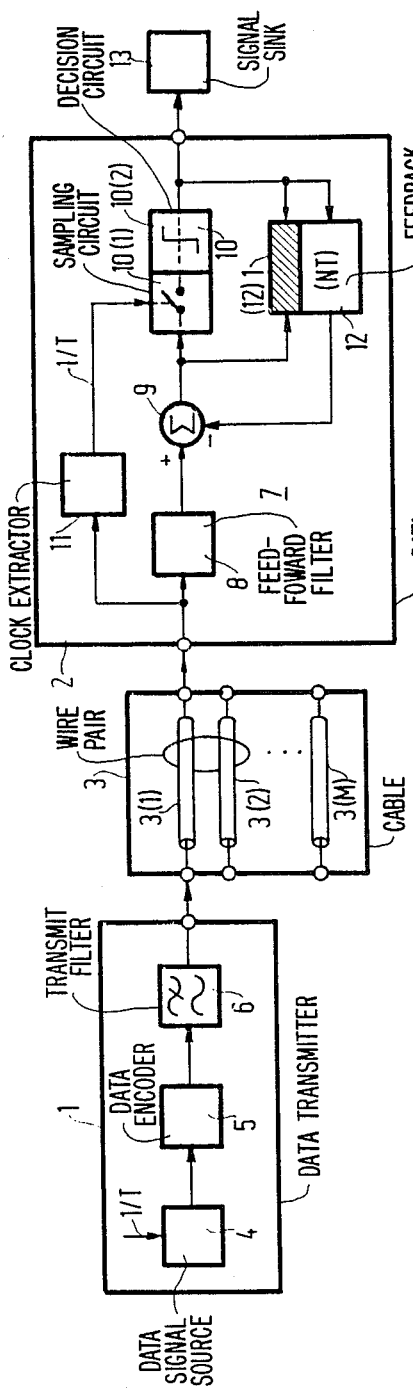
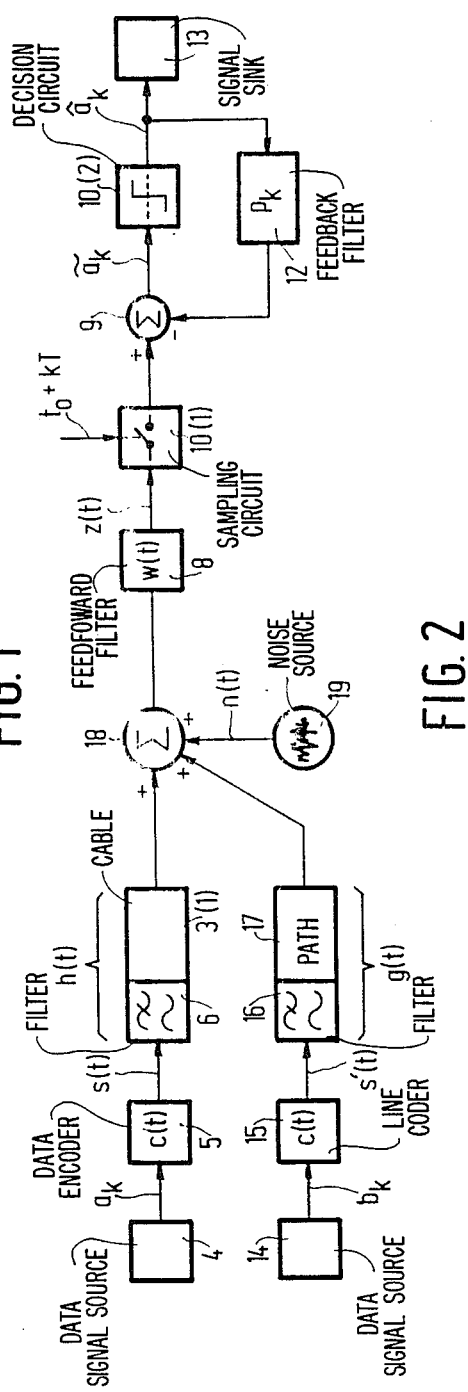
FIG. 1
FIG. 2

DATA SIGNAL TRANSMISSION SYSTEM USING DECISION FEEDBACK EQUALIZATION

BACKGROUND OF THE INVENTION

The invention relates to a system for transmitting data signals at a given symbol rate 1/T from a data transmitter to a data receiver through a channel of a transmission facility having a plurality of channels; the data transmitter comprising a data signal source connected to the said channel through a data encoder and a transmission filter; said channel being a dispersive transmission channel of a substantially minimum-phase character this transmission channel introducing into the transmitted data signal inter symbol interference as well as noise and crosstalk from similar data signals in the other channels of the transmission facility; and the data receiver comprising an equaliser of the decision feedback type which includes a feedforward filter connected between said channel and a first input to a difference circuit, a data signal regenerator connected to the output of the difference circuit and controlled by the symbol rate 1/T recovered from the transmitted data signal, and a feedback filter connected between the output of the data signal regenerator and a second input to the difference circuit.

Such a system is known from an article "Berechnung der Schrittfehlerwarscheinlichkeit bei ternärer Datenübertragung auf Teilnehmeranschluss leitungen Berücksichtigung des Nebensprechens" by H. Schenk, Frequenz, Vol. 38, No. 3, pp. 67–71, 1984, dealing with the influence of channel properties and crosstalk on the transmission of data signals through wire pairs in the existing local public telephone network.

Within the next few decades the existing analog local public telephone network will be used on a large scale for transmitting data signals and then form a constituent part of a completely digital network: the Integrated Services Digital Network (ISDN). In this ISDN a bit rate of 144 kbit/s standardized by CCITT and CEPT will be available to any subscriber for a combination of services. Together with additional information for synchronization of the receiver at a bit rate of, for example, 8 kbit/s this will lead to a data signal transmission at a bit rate of 152 kbit/s through wire pairs of the existing local public telephone network which were originally designed for transmission of analog signals having a bandwidth of approximately 4 kHz. Certainly at this relatively high bit rate, the imperfections of the existing local public telephone network such as line attenuation, crosstalk and impulse noise will result in impairments in the transmission quality.

The decision feedback equaliser (DFE) is pre-eminently suitable for combating inter symbol interference (ISI) in view of the substantially postcursive nature of ISI in an ISDN environment, which nature originates from the minimum-phase character of the wire pairs in the telephone cables of the local public telephone network. For cancelling the postcursive ISI the DFE comprises a feedback filter which synthesizes a replica of this postcursive ISI on the basis of a limited number of N symbol decisions that have already been formed and subtracts this replica from the version of the received data signal preprocessed by a feedforward filter. This feedforward filter has for its object to suppress any interference that cannot be cancelled by the feedback filter, especially the residual ISI occurring outside the span of length NT of the feedback filter, crosstalk from adjacent wire pairs and impulse noise. This feedforward filter should have a simple, preferably non-adaptive structure and yet be operative over a wide range of ambient conditions, such as varying cable lengths, varying crosstalk levels and different types of crosstalk. The amplitude level of the crosstalk suppressed by this feedforward filter should further depend as little as possible on the ever present relative phase differences between crosstalking and desired data signals. Finally, this feedforward filter should effectively suppress high-frequency disturbances, especially impulse noise. These objects are distinctly multifarious and even partly contradictary.

The complexity of this design problem has apparently led to the fact that in known transmission systems more or less ad hoc solutions for the feedforward filter are utilized; notably low-pass filters as known for linear equalisation (for example, compare the above article by Schenk). The dimensioning of such conventional feedforward filters essentially comes down to a rather delicate balance between crosstalk and residual ISI: a limitation of the filter bandwidth yields a better crosstalk suppression at the cost of additional residual ISI and vice versa. Thus, the maximum bandwidth fairly strongly depends on local ambient conditions, such as crosstalk levels which are hardly predictable in local public telephone networks and, what is more, often time-dependent. Besides, when dimensioning such feedforward filters, no account is taken of the fact that relative phase differences between crosstalking and desired data signals can significantly affect the instantaneous transmission quality.

SUMMARY OF THE INVENTION

The invention has for its object to provide a novel concept of the feedforward filter in a system of the type set forth in the preamble, which concept enables to realize an improved transmission quality at the same complexity of the feedback filter or less complexity of the feedback filter at the same transmission quality.

The system according to the invention is characterized in that the feedforward filter comprises a low-pass filter section having a substantially minimum-phase character and an amplitude-frequency characteristic $|W(f)|$ having a pronounced maximum $|W(f_m)|$ for a frequency $f_m$ near the frequency $f=1/((N+1)T)$, where NT is the memory span of the feedback filter corresponding with a number N of consecutive data symbols, the value $|W(f_m)|$ of this maximum being larger and as the memory span of the said channel is larger and as the number N is smaller, and the amplitude-frequency characteristic $|W(f)|$ substantially decreasing gradually for frequencies f exceeding $f_m$.

In practice, a suitable value $|W(f_m)|$ of the maximum of $|W(f)|$ can be simply determined by having $|W(f_m)|$ increase from a fixed value W(0) for the frequency $f=0$ until the effective duration of the impulse response of the linear part of the transmission section between the output of the data signal source and the output of the feedforward filter is smaller than or equal to $(N+2)T$.

Although the invention has originated from studies in the field of systems for transmission of data signals through wire pairs of the local public telephone network which utilize linear line codes such as NRZ and AMI (Non-Return-to-Zero and Alternate-Mark-Inversion) and this type of transmission systems will be discussed hereinafter, the invention is not restricted thereto, because the same principles can also be applied to different line codes such as ternary block codes of the 4B/3T type and to different types of transmission systems such as used for recording and reproducing digital signals. In the latter case, the channels are not constituted by wire pairs in a cable of the local public telephone network, but by tracks on a multitrack recording medium (such as magnetic tape or optical disc). The channels in these systems are also dispersive transmission channels suffering from crosstalk, namely crosstalk from adjacent tracks, and their transfer characteristic can be converted into a minimum-phase characteristic by means of a suitable filter inserted before the feedforward filter.

BRIEF DESCRIPTION OF THE DRAWING

Embodiments of the invention and their advantages will now be further explained with reference to the drawing, in which:

FIG. 1 shows a basic diagram of a system for the transmission of data signals through wire pairs in a cable of the local public telephone network;

FIG. 2 shows a model of the system of FIG. 1 for describing the effect of ISI, crosstalk and noise on the transmission of the desired data signal;

DETAILED DESCRIPTION OF THE INVENTION

Figure 3A:
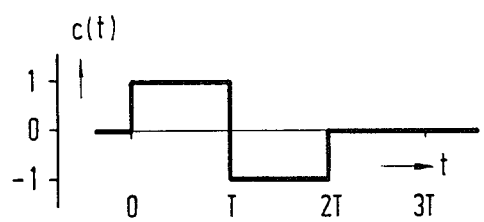
FIGS. 3A, 3B and 3C show the impulse responses of the line encoder in the transmitter of FIG. 1 for three line codes which are frequently used.

The explanation of the present transmission system is given for the case in which wire pairs in a cable of the existing local public telephone network constitute the transmission facility and the data signals are binary data signals having an ISDN standardized net bit rate of 144 kbit/s and a transmission rate (line rate) of 152 kbit/s. Although the use of the existing local public telephone network for ISDN requires full-duplex transmission over two wire lines in practice, the inherent specific problems (such as the need for echo cancellation for an efficient use of the available bandwidth) are disregarded in this explanation. Further, the transmission in only one direction (from subscriber to local exchange) is discussed with reference to the basic diagram of FIG. 1, because the transmission in the other direction (from local exchange to subscriber) is basically effected in the same way.

In the system of FIG. 1 binary data signals are transmitted at a bit rate of 152 kbit/s from a data transmitter 1 (at the subscriber station) to a data receiver 2 (at the local exchange) through a wire pair 3(1) in a telephone cable 3 having a plurality of wire-pairs 3(1)-3(M) In an ISDN environment, this telephone cable 3 will convey different binary data signals at any instant, while the transmission of all these data signals is controlled by a common clock signal of a rate $1/T = 152$ kHz, which clock signal originates from a source (not shown) in the local exchange.

Data transmitter 1 comprises a data signal source 4. synchronized with the common clock signal, for supplying binary data signals at a symbol rate $1/T$. These binary data signals are supplied to a wire pair 3(1) through a data encoder 5 and a transmit filter 6, which wire pair is a dispersive transmission channel of a substantially minimum-phase character and leads to inter symbol interference (ISI) in the transmitted data signal. In addition, the transmitted data signal is subject to disturbances in the form of impulse noise and crosstalk from similar data signals conveyed through the remaining wire pairs 3(2)-3(M) of telephone cable 3. The disturbances developed during this transmission through wire pair 3(1) are combated in data receiver 2. Thereto, data receiver 2 comprises an equaliser 7 of the decision feedback type which includes a feedforward filter 8 connected between wire pair 3(1) and a first input of a difference circuit 9, a data signal regenerator 10 controlled by the symbol rate $1/T$ recovered from the transmitted data signal by means of a clock extracter 11 and connected to the output of difference circuit 9, and a feedback filter 12 connected between the output of data signal regenerator 10 and a second input of difference circuit 9. The regenerated binary data signals are applied to a signal sink 13 representing the entire path from the input of the local exchange to the final destination.

In its basic form, data signal regenerator 10 of FIG. 1 includes a sampling circuit 10(1) sampling the output signal of difference circuit 9 every T seconds and a binary symbol decision circuit 10(2) with a decision threshold at the center between the nominal levels of the binary data signals. On the basis of the binary symbol decisions feedback filter 12 forms a cancelling signal for postcursive ISI which is subtracted from the output signal of feedforward filter 8 by means of difference circuit 9 in order to obtain the input signal for the data signal regenerator 10. This feedback filter 12 has a causal impulse response and a memory span NT corresponding with a number N of consecutive data symbols, so that the formed cancelling signal at any instant is a weighted combination of N consecutive binary symbol decisions already made. The weighting factors (coefficients of feedback filter 12) are adjusted such that the cancelling signal is as good a replica as possible of the postcursive ISI. This adjustment is generally effected in an adaptive way by implementing the known algorithms and techniques such as, for example, described in the book "Digital Communications" by J. G. Proakis, Mc Graw-Hill, 1983, Chapter 6, Section 6.5, pp. 382–386. This is schematically shown in FIG. 1 by the presence of an adaptation circuit 12(1) receiving the input and output signals of data signal regenerator 10.

Since the DFE circuit proper (9, 10, 11, 12) can remove only the postcursive ISI within the span NT of feedback filter 12, residual ISI outside this span NT as well as impulse noise and crosstalk from adjacent wire pairs 3(2)-3(M) should be suppressed in advance in the best possible way by means of feedforward filter 8. On budgetary grounds this feedforward filter 8 should have a simple, preferably non-adaptive structure, whereas it should be operative over a wide range of ambient conditions in the local public telephone network such as varying lengths of telephone cable 3, varying crosstalk levels which are hard to predict and different types of crosstalk, usually subdivided into near-end crosstalk NEXT and far-end crosstalk (FEXT), NEXT usually dominating in the local public telephone network.

In an ISDN environment telephone cable 3 at any instant conveys different binary data signals, the transmission of all these data signals being controlled by a common clock signal having a rate 1/T. The interference between these data signals caused by crosstalk is only relevant at the decision instants in the data receiver 2 and when determining the effect of this interference the cyclostationary nature of these data signals should be taken into consideration which nature is reflected in the fact that properties of the signal ensemble such as mean, variance and autocorrelation have a periodical time-dependence with a period T, compare the articles entitled "The Cyclostationary Nature of Crosstalk Interference from Digital Signals in Multi-Pair Cable", parts I and II, by J. C. H. Campbel, A. J. Gibbs and B. M. Smith in IEEE Trans. Commun., Vol. COM-31, No. 5, pp. 629–637 and 638–649, May 1983. As a result of this cyclostationarity relative phase differences between crosstalking data signals and the desired data signal may have a great impact on the instantaneous transmission quality. Therefore, it is desirable that the amplitude level of the crosstalk suppressed by the feedforward filter 8 depend as little as possible on these relative phase differences.

The effect of ISI, crosstalk and noise on the transmission of the desired data signal in the system of FIG. 1 can be described with reference to a system model represented in FIG. 2 which is derived from FIG. 1 with some realistic assumptions. In the FIGS. 1 and 2 corresponding elements are referenced by identical reference symbols.

The data signal on wire pair 3(1) is subject to crosstalk from a plurality of similar data signals which can be conveyed through all remaining wire pairs 3(2)-3(M). The geometry of telephone cable 3, however, results in a small number of crosstalking data signals having a relatively highly disturbing effect and the remaining crosstalking data signals having only little effect. The net result of the latter category can be modelled realistically as colored, stationary Gaussian noise, even though the crosstalk components themselves are cyclostationary, compare the above articles by Campbell et al. The dominant crosstalk components, however, may not be modelled as stationary noise, but have to be modelled making due allowance for their cyclostationary nature. In FIG. 2 only the dominant crosstalk component is shown, for simplicity, that is to say, the component in telephone cable 3 originating from the wire pairs 3(2) forming a so-called "quad" with wire pair 3(1), compare the above article by Schenk. Further, the sampling circuit 10 (1) of signal regenerator 10 in FIG. 1 is now inserted before the input of difference circuit 9 in FIG. 2 for simplifying the signal description in the DFE circuit, but for the operation of the DFE circuit this modification is of minor importance.

Figure 3B:
Figure 3C:

In the main signal path of FIG. 2 data signal source 4 produces a binary data sequence $a_k$ with $a_k \in \{-1, +1\}$. By means of a data encoder 5 this data sequence $a_k$ is converted into a line signal $$s(t) = \sum_{k=-\infty}^{\infty} a_k c(t - kT), \qquad (1)$$

where c(t) is the impulse response of data encoder 5. To simplify the analysis, in FIG. 2 the processes such as differential encoding or non-linear precoding are assumed to have taken place in data signal source 4, so that data encoder 5 may be considered a linear encoder (line coder). This supposition does not have a material effect on the results of the analysis. For illustrative purposes FIG. 3 shows the shape of impulse response c(t) of line coder 5 for three line codes applied frequently, that is to say, for AMI (Alternate-Mark-Inversion) in FIG. 3A, for NRZ (Non-Return-to-Zero) in FIG. 3B and for Bi-Phase in FIG. 3C. After transmission through transmit filter 6 and wire pair 3(1) with a combined impulse response h(t) and feedforward filter 8 with an impulse response w(t), at the input of sampling circuit 10(1) a signal z(t) occurs which satisfies $$z(t) = \sum_{k=-\infty}^{\infty} a_k (c * h * w)(t - kT) + d(t), \qquad (2)$$

where the symbol "*" denotes the linear convolution operator and (c*h*w) (t) represents the system impulse response of the main signal path of FIG. 2. In formula (2) the term d(t) denotes the effect of additive interference in the form of impulse noise (thermal noise can usually be neglected in local public telephone networks) and crosstalk from adjacent wire pairs 3(2)-3(M).

The cyclostationary crosstalk component of interference term d(t) originates from wire pair 3(2) forming a "quad" with wire pair 3(1). To wire pair 3(2) is connected a data transmitter of a similar structure as data transmitter 1 in FIG. 1, a data signal source 14 producing a data sequence $b_k$ with $b_k \in \{-1, +1\}$ to a line coder 15 also having an impulse response c(t), and the line signal thus obtained $$s'(t) = \sum_{k=-\infty}^{\infty} b_k c(t - kT) \qquad (3)$$

being applied to wire pair 3(2) through transmit filter 16. The coupling of wire pair 3(2) with wire pair 3(1) is depicted in FIG. 2 by a coupling path 17 which is connected to wire pair 3(1) through summator 18 at the input of feedforward filter 8, the combination of transmit filter 16 and coupling path 17 having an impulse response g(t). The remaining crosstalk components and the impulse noise are reflected in FIG. 2 by a noise source 19 supplying a stationary noise signal n(t) to summing circuit 18. The interference term d(t) in formula 2 is then described by $$d(t) = \sum_{k=-\infty}^{\infty} b_k (c * g * w)(t - \tau - kT) + (n * w)(t), \qquad (4)$$

where the delay $\tau$ denotes the phase difference between the dominating crosstalking data signal and the desired data signal, which phase difference may have a large impact on the instantaneous transmission quality.

For obtaining estimates $\hat{a}_k$ of the original data signal $a_k$ the output signal $z(t)$ of feedforward filter 8 is sampled at sampling points $t = t_0 + kT$, and combating postcursive ISI is effected by providing feedback filter 12 with a suitable impulse response $p_k$, for which holds $$p_k = \begin{cases} (c * h * w)(t_0 + kT), & k \in \{1, \ldots, N\}, \\ 0, & k \notin \{1, \ldots, N\}, \end{cases} \qquad (5)$$

and applying to this feedback filter 12 the symbol decisions $\hat{a}_k$ which are formed by symbol decision circuit 10(2). In view of the finite span of length NT of feedback filter 12 its output signal at any instant k is exclusively determined by the previous symbol decisions $\hat{a}_{k-i}$ with $i \in \{1, \ldots N\}$. Under normal operating conditions these symbol decisions are correct, that is to say $$\hat{a}_{k-i} = a_{k-i}, \; i \in \{1, \ldots, N\}, \qquad (6)$$

so that all postcursive ISI within the span of length NT of feedback filter 12 is removed from the sampled version $z(t_0+kT)$ of the output signal $z(t)$ of feedforward filter 8.

On the basis of the preceding formulas at the input of symbol decision circuit 10(2) an estimate $\bar{a}_k$ of the original data signal $\bar{a}_k$ will develop for which holds $$\bar{a}_k = a_k(c * h * w)(t_0) + \sum_{\substack{i=-\infty \\ i \notin \{1,\ldots,N\}}}^{\infty} a_{k-i}(c * h * w)(t_0 + iT) + \qquad (7)$$

$$\sum_{i=-\infty}^{\infty} b_{k-i}(c * g * w)(t_0 - \tau + iT) + (n * w)(t_0 + kT).$$

Formula (7) shows that the estimate $\bar{a}_k$ of the original data signal $a_k$ comprises the desired signal component $a_k(c*h*w)(t_0)$ and further the interference terms representing residual ISI, filtered crosstalk and filtered noise, respectively. The interference terms are divisible into a cyclostationary category (residual ISI and filtered crosstalk, second and third terms in the right-hand side of formula (7)) and a stationary category (filtered noise, fourth term in formula (7)), the former category usually dominating in practice. Now, it is the task of feedforward filter 8 to minimize the combined influence of both categories of interference terms.

Figure 4:
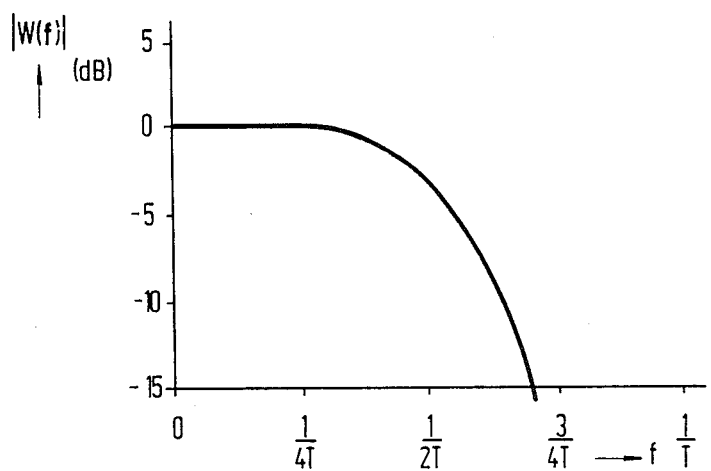
FIG. 4 shows the amplitude-frequency characteristic of a conventional feedforward filter in the receiver of FIG. 1.

As explained hereinbefore, the requirements imposed on feedforward filter 8 are multifarious and even partly contradictary. The complexity of this packet of requirements obviously has led to the fact that in conventional systems more or less ad hoc solutions are used for feedforward filter 8 in the form of simple types of low-pass filters having a substantially flat amplitude-frequency characteristic $|W(f)|$ in the pass band as are known for linear equalisation. By way of illustration FIG. 4 shows the form $|W(f)|$ on a logarithmic scale when for a transmission rate of 152 kbit/s a feedforward filter 8 is used according to the above article by Schenk (see equation (6) therein with the value r=0.5 given on page 71). By the choice of the cut-off frequency of this feedforward filter 8 it has been tried to minimize the combined effect of crosstalk and residual ISI. Such a dimensioning, however, leads to a rather critical balance between crosstalk and residual ISI. For, a limitation of the filter bandwidth gives a better crosstalk suppression (which is manifested more strongly at higher frequencies), but as a result of the increase of the effective duration of the system impulse response $(c*h*w)(t)$ attending this bandwidth limitation, additional residual ISI will occur, and vice versa. The maximum bandwidth of this conventional feedforward filter 8 thus fairly strongly depends on the local ambient conditions, such as cable lengths, crosstalk levels and types of crosstalk, which conditions may vary strongly in local public telephone networks.

The invention now provides an entirely different concept of feedforward filter 8. With a memory span of feedback filter 12 having a length NT, feedforward filter 8 comprises, according to this concept, a low-pass filter section with a substantially minimum-phase character and an amplitude-frequency characteristic $|W(f)|$ which, in contradistinction to the conventional substantially flat shape in the pass band, presents a pronounced maximum for a frequency $f_m$ near the frequency $f = 1/((N+1)T)$ and for frequencies f exceeding $f_m$ substantially decreases gradually, the value $|W(f_m)|$ of this maximum being greater as the physical length L of wire pair 3(1) in telephone cable 3 is larger and as the memory span NT is smaller.

In practice a suitable value $|W(f_m)|$ can be simply determined by having, at given values of L and NT, this value $|W(f_m)|$ increase from the fixed value $W(0)$ at frequency $f=0$ until the effective furation of the system impulse response $(c*h*w)(t)$ of the linear part of the transmission section between the output of data signal source 4 in data transmitter 1 and the output of feedforward filter 8 in data receiver 2 is smaller than or is equal to $(N+2)T$. Such a small effective duration cannot be achieved, of course, if an impractically small value is chosen for NT with, for example, $N < 5$.

Figure 5A:
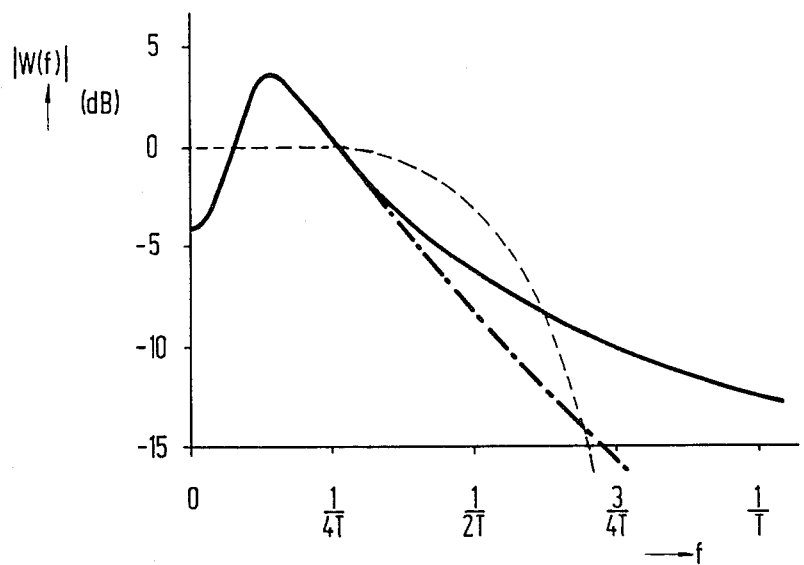
FIG. 5A shows the amplitude-frequency characteristic of two feedforward filters according to the invention as well as the characteristic of FIG. 4.

FIG. 5A shows the shape of $|W(f)|$ achieved in this manner at a logarithmic scale in the case when binary data signals of 152 kbit/s are transmitted by means of an AMI line code through a wire pair 3(1) of a type used often (wire diameter 0.4 mm, capacity 46 nF/km) having a length $L = 4$ km and further feedback filter 12 presents an impulse response with a duration $NT = 5T$ ($N = 5$). The case under consideration is indicative of the worst situation conceivable which may occur in practice in transmission systems for ISDN. For comparison, the form of $|W(f)|$ for a conventional feedforward filter 8 is shown (see FIG. 4), and that by a solid line and at such a scale that in both cases at the optimum sampling point (thus at an optimum value of $t_0$ for detection of data symbol $a_k$ at instant $t_0 + kT$) the amplitude of the desired signal component $a_k (c*h*w)(t_0)$ in the right-hand side of formula (7) has the same value.

Figure 5B:
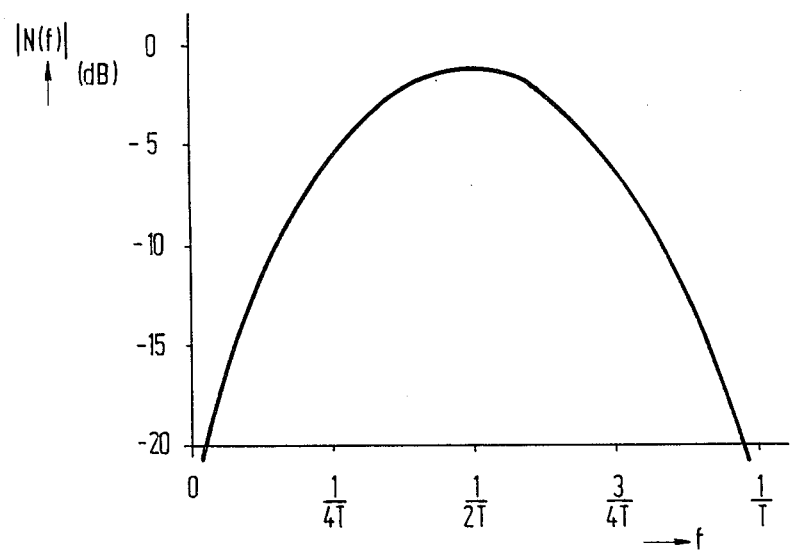
FIG. 5B shows a power spectrum representative of near-end crosstalk.

To illustrate the improved crosstalk suppression FIG. 5B shows a power spectrum representative of near-end crosstalk (NEXT), having a pronounced maximum for a frequency near the Nyquist frequency $f = 1/(2T)$. At the expense of a markedly larger value for frequencies near $f = 1/((N+1)T) = 1/(6T)$ the amplitude-frequency characteristic $|W(f)|$ of the novel feedforward filter (solid line in FIG. 5A) has a markedly smaller value than that of the conventional feedforward filter (dashed line in FIG. 5A) for frequencies near to the Nyquist frequency $f=1/(2T)$. Although the weak spectral crosstalk components (with a frequency $f$ near to $f=1/((N+1)T)=1/(6T)$ are amplified in this way, the most important part of the crosstalk spectrum around the Nyquist frequency $f=1/(2T)$ is attenuated better in this way than with the conventional feedforward filter. Thus, a significantly better net crosstalk suppression is achieved.

Figure 6A:
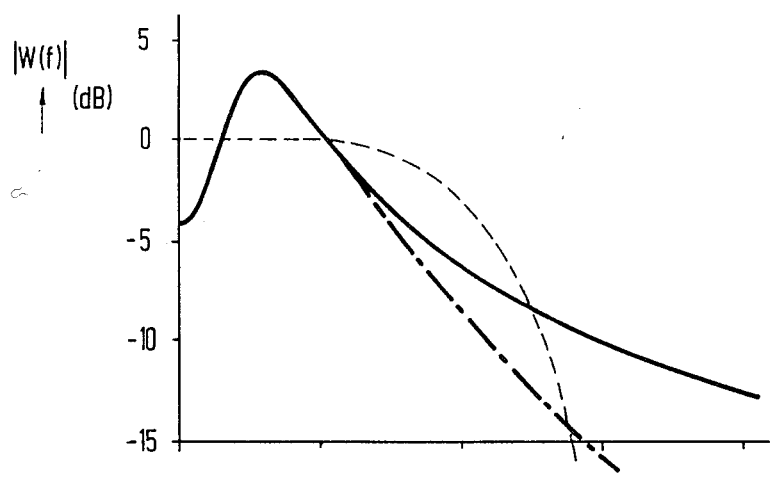
FIG. 6A again shows the amplitude-frequency characteristics of FIG. 5A.
Figure 6B:
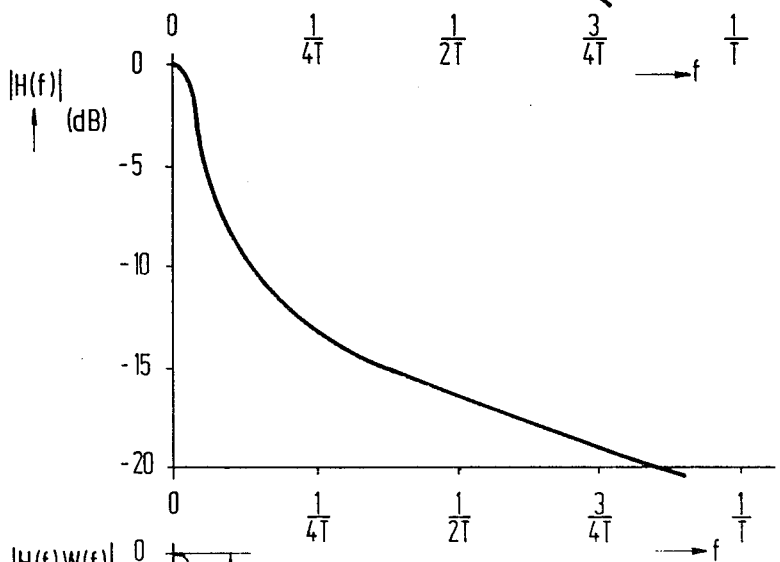
FIG. 6B shows the amplitude frequency characteristic of a wire pair in a telephone cable.

In addition, this better crosstalk suppression is attended with an enlargement of the bandwidth of the cascade arrangement of transmit filter 6, wire pair 3(1) and feedforward filter 8, as will now be explained with reference to FIG. 6. wherein FIG. 6A again shows the amplitude-frequency characteristics $|W(f)|$ of FIG. 5A, FIG. 6B showing the amplitude-frequency characteristic $|H(f)|$ of the cascade arrangement of transmit filter 6 and wire pair 3(1) of the above type with a length $L=4$ km in the not unusual case in which transmit filter 6 is absent. For brevity, the influence of transmit filter 6 will not be considered hereinafter.

Figure 6C:
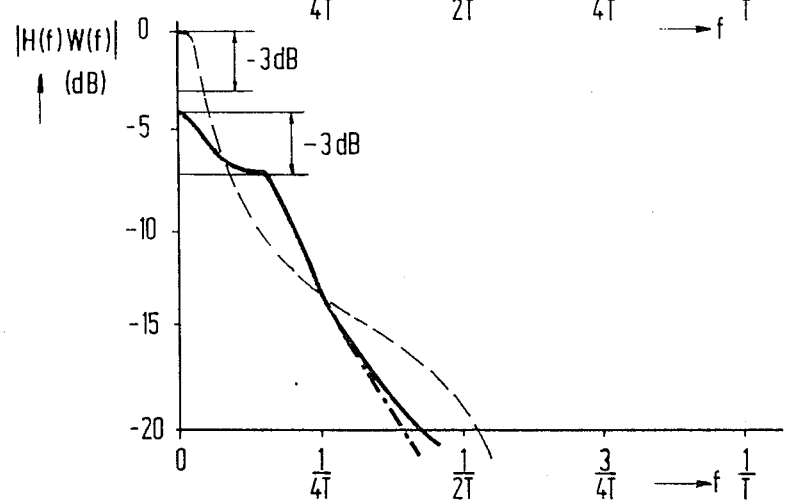
FIG. 6C shows the amplitude-frequency characteristics of the cascade arrangement of feedforward filters as shown in FIG. 6A and the wire pair as shown in FIG. 6B.
Figure 7A:
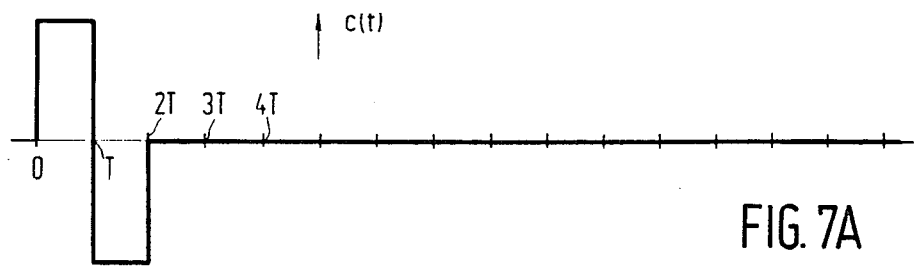
FIGS. 7A and 7B show the respective impulse responses of the line encoder and the cascade arrangement of line encoder and wire pair when using the AMI line code and the wire pair as shown in FIG. 6B, and FIGS. 7C and 7D show the system impulse responses in the case of FIG. 7B when using the conventional filter as shown in FIG. 4 and the new filters as shown in FIG. 5A, respectively.
Figure 7B:
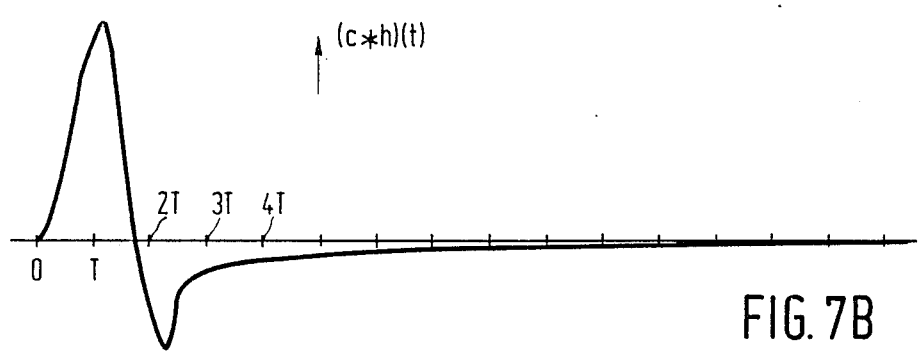
Figure 7C:
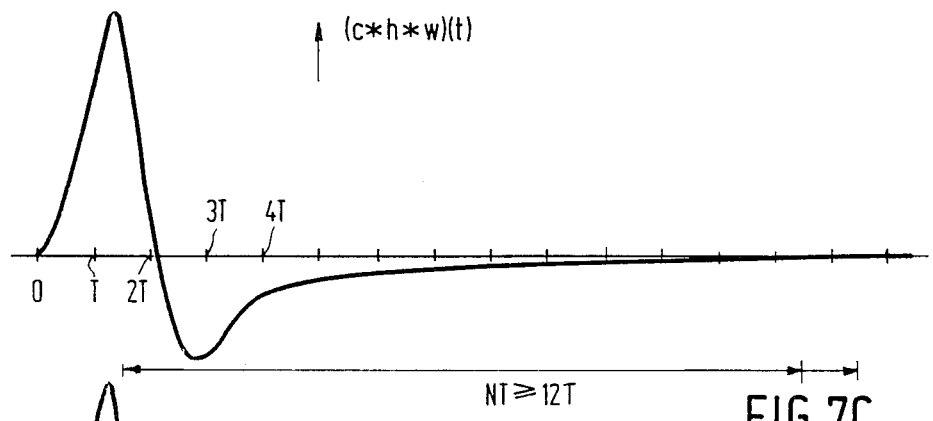
Figure 7D:
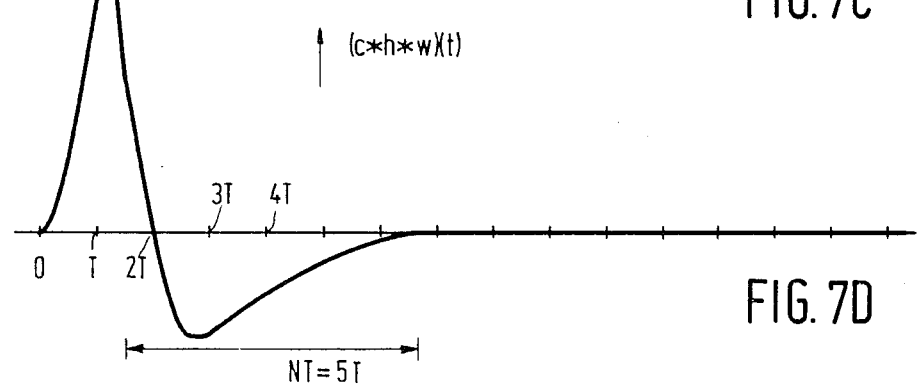

Because the conventional characteristic $|W(f)|$ as shown in FIG. 6A to approximately the Nyquist frequency $1/(2T)$ has a substantially flat shape for frequencies up to the amplitude-frequency characteristic $|H(f)W(f)|$ of the cascade arrangement of wire-pair 3(1) and this conventional feedforward filter 8 will mainly be determined for these frequencies by the amplitude-frequency characteristic $|H(f)|$ of this wire pair 3(1). This leads to a very "narrow-band" nature of $|H(f)W(f)|$, as also appears from FIG. 6C in which $|H(f)W(f)|$ is shown by a dashed line and in which the $-3$ dB bandwidth in this case is approximately $0.04/T$. On the other hand, the novel filter according to the solid line in FIG. 5A has a pronounced maximum of $|W(f)|$ for a frequency $f_m$ near to $f=1/((N+1)T)=1/(6T)$. The rise of $|W(f)|$ up to the frequency $f_m$ provides a compensation of the fall of $|H(f)|$ of wire pair 3(1), so that the cascade arrangement of wire pair 3(1) and the novel feedforward filter 8 presents an amplitude-frequency characteristic $|H(f)W(f)|$ varying much less up to the frequency $f_m$. This leads to a characteristic $|H(f)W(f)|$ having a much wider band, as also appears from FIG. 6C, in which this characteristic $|H(f)W(f)|$ is represented by a solid line, and in which the $-3$ dB bandwidth in this case is approximately $1/((N+1)T)=1/(6T)$, which means an improvement by approximately a factor of 4. It goes without saying that this considerable enlargement of the bandwidth leads to an equally considerable shortening of the impulse response $(h*w)(t)$ of the cascade arrangement of wire pair 3(1) and feedforward filter 8. More specifically, the inverse $(N+1)T=6T$ of the bandwidth forms a first-order approximation for the effective duration of this impulse response $(h*w)(t)$. Because the impulse response $c(t)$ of data encoder 5 according to FIG. 3 extends over 1 or at most 2 symbol intervals T, the system impulse response $(c*h*w)(t)$ will extend over a duration of approximately $(N+2)$ symbol intervals T, which is considerably less than in the conventional case. This will be illustrated with reference to FIG. 7, in which FIG. 7A shows the impulse response $c(t)$ of data encoder 5 when using the AMI line code (compare also FIG. 3A), FIG. 7B shows the impulse response $(c*h)(t)$ of the cascade arrangement of data encoder 5 and wire pair 3(1) of the already mentioned type, FIG. 7C shows the associated system impulse response $(c*h*w)(t)$ when utilizing the conventional feedforward filter according to FIG. 5A (dashed line), and FIG. 7D shows the associated system impulse response $(c*h*w)(t)$ when utilizing the novel feedforward filter as shown in FIG. 5A (solid line). As clearly appears from FIGS. 7C and 7D the effective duration of this system impulse response $(c*h*w)(t)$ when implementing the novel feedforward filter (FIG. 7D) is considerably smaller than when utilizing the conventional feedforward filter (FIG. 7C).

On the basis of formula (5) this considerable shortening advantageously enables considerable reduction of the memory span NT of feedback filter 12, and thus enables a simpler implementation as shown diagrammatically in FIGS. 7C and 7D, respectively. In the present example a value $NT=5T$ will suffice for the novel feedforward filter 8 instead of the value $NT \geq 12T$ required in the conventional feedforward filter 8. Such a small value $NT=5T$ presents the additional practical advantage that feedback filter 12 can be designed as an exteremely simple table look-up filter, which for $NT=5T$ is less complex than for $NT \geq 12T$ by several orders of magnitude.

The above described trade-off between crosstalk suppression and residual ISI suppression in the conventional feedforward filter 8 is no longer critical in a feedforward filter 8 according to the invention, because the dimensioning of this feedforward filter 8 for achieving a practically negligible residual ISI automatically appears to lead to a systematically better crosstalk suppression. Thus, in the present example an improved transmission quality is achieved with less complexity of feedback filter 12.

On the basis of the above explanation it is simple to recognize in what way the variation of the depicted filter characteristic depends on the physical length L of wire pair 3(1) and the memory span NT of feedback filter 12. This will be explained with reference to the FIG. 6 already discussed.

An increase in the physical length L of wire pair 3(1) will lead to an amplitude-frequency characteristic $|H(f)|$ with a narrower band than shown in FIG. 6B. To realize a system impulse response $(c*h*w)(t)$ with a same effective duration of $N+2$ symbol intervals T, $|H(f)W(f)|$ should present virtually the same $-3$ dB bandwidth $1/((N+1)T)$ as shown in FIG. 6C. This is only possible by compensating the faster fall of $|H(f)|$ by a corresponding faster rise of $|W(f)|$ up to the frequency $f_m$ whose position has not changed. This leads to a greater value of the maximum $|W(f_m)|$ of $|W(f)|$ than shown in FIG. 6A. In practice, a suitable fixed dimensioning of feedforward filter 8 can be determined by starting from the most unfavourable practical situation, occurring at the largest possible physical length L of wire pair 3(1), in which the received data signal, for that matter, is attenuated the most strongly and therefore disturbed the most. At smaller physical lengths L the dimensioning of feedforward filter 8 is then strictly speaking, not optimal, but the consequent degradation of the transmission quality will be amply compensated for by the improvement due to the smaller attennuation of the received data signal.

For a fixed physical length L of wire pair 3(1) it can be simply recognized in what way the value of the maximum $|W(f_m)|$ and the frequency $f_m$ at which this maximum occurs depend on the memory span NT of feedback filter 12. A larger memory span NT than the value $NT=5T$ used in FIG. 6A permits the system impulse response (c*h*w)(t) to extend over a larger effective length (N+2)T, which implies that the amplitude-frequency characteristic |H(f)W(f)| is allowed to have a smaller −3 dB bandwidth 1/((N+1)T). This implies that the fall of |H(f)| need only be compensated for over a smaller frequency range by a corresponding rise of |W(f)|, so that both the value |W($f_m$)| of the maximum of |W(f)| and the frequency $f_m$ at which this maximum occurs become smaller. Naturally, in the other sense, it is impossible with the simple characteristic of the novel feedforward filter 8 in FIG. 6A to continue to sufficiently compensate for the variation of |H(f)| over a considerably wider frequency range than shown in FIG. 6, so that in practice no smaller value for NT than approximately 5T will be achievable.

To obtain the attractive propeties of feedforward filter 8 the depicted transfer characteristic W(f) can, in addition, be realized in a simple way as will now be explained. For, it appears to be possible to describe the transfer characteristic W(f) in good approximation as a second-order transfer function of the form $$W(f) = W(0) \frac{1 + j\alpha(f/f_0)}{1 + j2\beta(f/f_0) - (f/f_0)^2}, \quad (8)$$

where W(0) is a real scale factor, $f_o$ is decisive for the position $f_m$ of the maximum |W($f_m$)| of |W(f)|, α is substantially decisive for the value of this maximum, and an appropriate value of β is approximately 0.5 to 0.8, so that W(f) has complex conjugate poles. In order to realize that W(f) is a minimum-phase characteristic, α should be positive. This is desirable because then also the transfer characteristic of the main signal path in FIG. 2 is substantially minimum-phase, and it is generally known that minimum-phase systems are pre-eminently suitable for the application of decision feedback equalisation.

In the example of FIG. 5A with 1/T=152 kHz the depicted amplitude-frequency charactersitic |W(f)| relates to a transfer function W(f) according to formula (8) with a value $f_oT$=0.155, α=2.67 and β=0.55.

Figure 8:
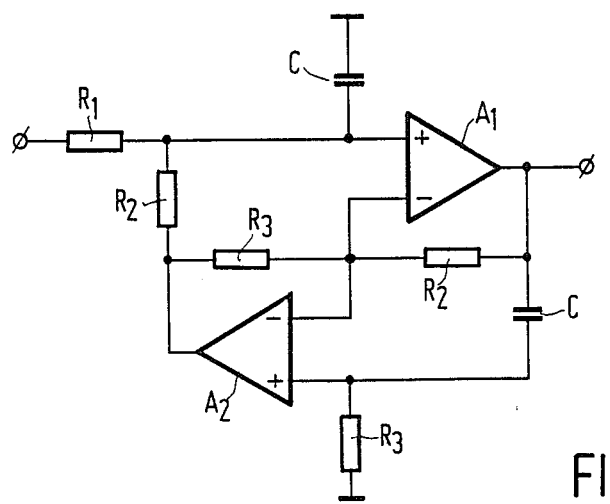
FIG. 8 shows an example of a simple implementation of a filter according to the invention.

The transfer function according to formula (8) can be simply realized by a second-order active filter with two operational amplifiers as described in an article entitled "A New Class of Second-Order RC-Active Filters with two Operational Amplifiers" by N. Fliege, Nachrichtentech. Z., Vol. 26, pp. 279–282, June 1973. An example of such a realization is represented in FIG. 8. The filter in FIG. 8 comprises two operational amplifiers $A_1$ and $A_2$, whose inverting inputs are interconnected. The filter input is connected through a resistor $R_1$ to the non-inverting input of amplifier $A_1$, whose output is fed back to its inverting input through resistor $R_2$. The output of amplifier $A_1$ forms the filter output which is connected through a capacitor C to the non-inverting input of amplifier $A_2$, whose output is fed back to its inverting input and through a resistor $R_3$ and is also connected to the non-inverting input of amplifier $A_1$. Through a resistor $R_2$ further, capacitor C is connected between the non-inverting input of amplifier $A_1$ and earth and a resistor $R_3$ between the non-inverting input of amplifier $A_2$ and earth. For ideal operational amplifiers $A_1$ and $A_2$ it can be deduced that the transfer function of the filter in FIG. 8 is given by formula (8) if the following relationships are satisfied $2\pi f_o = 1/(R_2C)$, $\alpha = R_3/R_2$, $2\beta = R_2/R_1$ and $W(0) = R_2^2/(R_1R_3)$. The values $F_oT$=0.155, α=2.67 and β=0.55 that are characteristic of FIG. 5A can thus be realized by chosing for $R_1$, $R_2$, $R_3$ and C the values 51.1 kΩ, 56.2 kΩ, 150 kΩ, and 120 pF. In addition to the embodiment of feedforward filter 8 shown in FIG. 8 a great variety of different other embodiments are feasible.

While maintaining the achieved suppression of residual ISI and crosstalk this novel feedforward filter 8 can be arranged such that an even better suppression of high-frequency noise components is realized. To that end, in a preferred embodiment the above described feedforward filter 8 can be extended by a second low-pass filter section having a transfer function which is substantially constant for frequencies up to approximately the Nyquist frequency 1/(2T) and an amplitude-frequency characteristic which decreases for higher frequencies with a predetermined slope of approximately 18 or 24 dB per octave. As is generally known, such a characteristic can be realized by means of classical filter types such as Butterworth and Thomson filters, and in practice a third or fourth order filter will generally lead to an adequate suppression of high-frequency noise components. As this second filter section has a substantially constant transfer function for frequencies below approximately the Nyquist frequency 1/(2T), the behavior of feedforward filter 8 in this frequency range will be substantially determined by the extensively discussed first filter section. Consequently, the achieved suppression of residual ISI will remain virtually unchanged, while the achieved suppression of crosstalk will even be further improved. This can be simply illustrated with reference to FIGS. 5, 6 and 7.

For the case of a second filter section in the form of a third-order Thomson filter having a cut-off frequency of f=0.55/T −3 dB point), FIGS. 5A and 6A show the amplitude-frequency characteristic |W(f)| of feedforward filter 8 comprising these two filter sections by a dash-and-dot line insofar as it differs from the shape of |W(f)| for the first filter section (solid line). From FIG. 5A it appears that the most important part of the crosstalk spectrum of FIG. 5B around the Nyquist frequency f=(2T) has a clearly better suppression as a result of the addition of the second filter section. On the other hand, however, it appears from FIG. 6C that the addition of the second filter section has no practical influence whatsoever on the form of the amplitude-frequency characteristic |H(f)W(f)| of the cascade arrangement of wire pair 3(1) and feedforward filter 8 for frequencies below f=1/(4T). After the explanation of FIG. 6 presented hereinbefore it is clear that also in the case of the second filter section the suppression of residual ISI remains virtually unchanged. This is confirmed by the fact that the system impulse response (c*h*w)(t) in the case of feedforward filter 8 comprising both filter sections in practice does not substantially differ from that in FIG. 7D for the case of feedforward filter 8 comprising only the first filter section.

Figure 9:
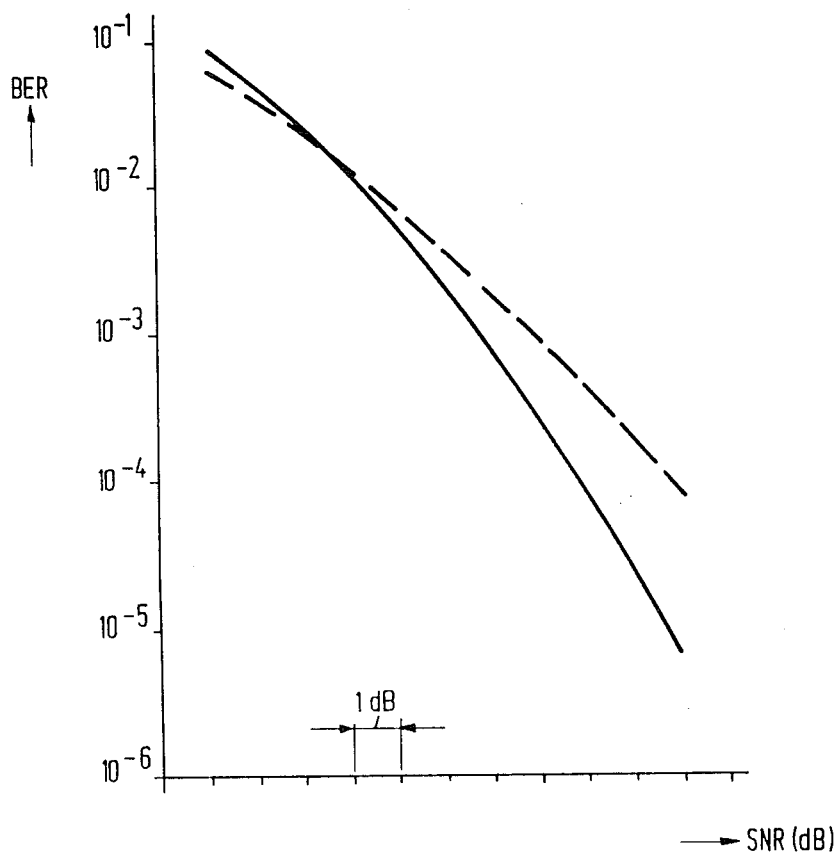
FIG. 9 shows a set of graphs for illustrating the transmission quality achievable with a conventional filter and with a filter according to the invention.

For illustration of the merits of the invention FIG. 9 shows a set of graphs obtained by measurements made on a pair of practical systems, that is to say, a system with a conventional feedforward filter 8 according to FIG. 4 in combination with the feedback filter 12 with NT=12T (dashed line) and a system with a novel feedforward filter 8 in combination with a considerably simpler feedback filter 12 with NT=5T (solid line). The novel feedforward filter 8 comprises a first filter section according to FIG. 8 and the associated component values which lead to the solid line characteristic of FIG. 5A, and a second filter section in the form of a third-order Thomson filter which leads to the dash-and-dot line characteristic in FIG. 5A for the cascade arrangement of the two sections and for frequencies above approximately $f=1/(4T)$. In both systems use is made of the AMI line code and a wire pair 3(1) of the type mentioned before with a length $L=4$ km, while through wire pair 3(2) forming a quad with wire pair 3(1), near-end crosstalk (NEXT) is introduced with a fixed average power level at the input of feedforward filter 8 of $-10$ DB with respect to the received desired data signal. Additionally, Gaussian noise is injected with an adjustable power level into the input of feedforward filter 8. The graphs of FIG. 9 show the measured bit error rate (BER) as a function of the signal-to-noise ratio (SNR) at the input of feedforward filter 8, in the situation of the most unfavourable phase difference $\tau$ conceivable between desired data signal component and crosstalk component. For values of SNR belonging to bit error rates of $10^{-4}$ or smaller FIG. 9 shows that the application of feedforward filter 8 according to the invention leads to a bit error rate which is many times smaller than achievable by means of the conventional feedforward filter 8. Further measurements confirm that the transmission quality realized by means of the conventional feedforward filter indeed depends much more strongly on the said phase difference $\tau$ between the desired data signal component and the crosstalk component than the transmission quality realized by means of the novel feedforward filter 8. As already mentioned before, the overall improvement thus achieved of the performance level of the receiver 2 in FIG. 1 is attended with a considerable simplification of feedback filter 12 and hence of the DFE circuit proper (9,10,11,12).

What is claimed is:

1. A system of the type for transmitting data signals at a given symbol rate $1/T$ from a data transmitter to a data receiver through a channel of a transmission facility having a plurality of channels; the data transmitter comprising a data signal source connected to the said channel through a data encoder and a transmit filter; said channel being a dispersive transmission channel of a substantially minimum-phase character, this transmission channel introducing into the transmitted data signal inter symbol interference as well as noise and crosstalk from similar data signals in the remaining channels of the transmission facility; and the data receiver comprising an equaliser of the decision feedback type which includes a feedforward filter connected between said channel and a first input of a difference circuit, a data signal regenerator connected to the output of the difference circuit and controlled by the symbol rate $1/T$ recovered from the transmitted data signal, and a feedback filter connected between the output of the data signal regenerator and a second input of the difference circuit, characterized in that the feedforward filter comprises a low-pass filter section having a substantially minimum-phase character and an amplitude-frequency characteristic $|W(f)|$ which has a pronounced maximum $|W(f_m)|$ for a frequency $f_m$ near the frequency $f=1/((N+1)T)$, where NT is the memory span of the feedback filter corresponding with a number of N consecutive data symbols, the value $|W(f_m)|$ of this maximum being greater as the memory span of the said channel is larger and as the number N is smaller, and the amplitude-frequency characteristic $|W(f)|$ substantially decreasing gradually for frequencies exceeding $f_m$.

2. A system as claimed in claim 1, characterized in that the value $|W(f_m)|$ of the maximum of $|W(f)|$ is determined by having $|W(f_m)|$ increase from a fixed value $W(0)$ for the frequency $f=0$ until the effective duration of the impulse response of the linear part of the transmission section between the output of the data signal source and the output of the feedforward filter is smaller than or equal to $(N+2)T$.

3. A system as claimed in claim 1 or 2, characterized in that the feedforward filter comprises a second low-pass filter section with a transfer characteristic which is substantially constant for frequencies up to approximately the Nyquist frequency $=1/(2T)$ and an amplitude-frequency characteristic decreasing with a predetermined slope for higher frequencies.

4. A system as claimed in claim 1 or 2, characterized in that the low-pass filter section has a second-order transfer function $W(f)$ of the form $$W(f) = W(0) \frac{1 + j\alpha(f/f_0)}{1 + j2\beta(f/f_0) - (f/f_0)^2} \quad ,(9)$$

where $W(0)$ is a real scale factor, $f_o$ is decisive for the position $f_m$ of the maximum $|W(f_m)|$ of $|W(f)|$, $\alpha$ is positive and substantially decive for the value of this maximum, and the value of $\beta$ is approximately 0.5 to 0.8.

5. A data transmission system comprising:
   a. a data transmitter for transmitting data signals at a given symbol rate $1/T$, comprising:
      i. a signal source;
      ii. an encoder coupled to the signal source;
      iii. a transmit filter coupled to the encoder;
   b. a channel, which is part of a transmission facility having a plurality of channels, the channel being coupled to the transmit filter and being a dispersive transmission channel of a substantially minimum-phase character, the channel introducing inter symbol interference, noise, and crosstalk into the data signal from similar data signals in the remaining channels of the transmission facility;
   c. a data receiver comprising a decision feedback equalizer, the equalizer comprising:
      i. a difference circuit having first and second inputs and an output;
      ii. a data signal regenerator having an output and an input coupled to the output of the difference circuit and being controlled by the symbol rate $1/T$ recovered from the data signal;
      iii. a feedback filter, coupled between the output of the data signal regenerator and the second input of the difference circuit, and having a memory span NT corresponding with a number N of consecutive data symbols;
      iv. a feedforward filter having an input coupled to said channel and an output coupled to the first input of the difference circuit, comprising:
         A. a low-pass filter section having a substantially minimum phase character and an amplitude-frequency characteristic $|W(f)|$ which has a pronounced maximum $|W(f_m)|$ for a frequency $f_m$ near the frequency $f=1/((N+1)T)$, the value $|W(f_m)|$ increasing as the memory span of the channel increases and as the number N decreases, and the amplitude-frequency characteristic $|W(f)|$ substantially decreasing gradually for frequencies exceeding $f_m$.

6. In a data receiver having a decision feedback equalizer for receiving digital data signals transmitted through a dispersive channel and corrupted by intersymbol interference and crosstalk, the improvement comprising: an optimized feedforward filter for receiving the corrupted digital data signals and filtering the same and for applying the filtered digital data signals to said decision feedback equalizer; said decision feedback equalizer operating at a clock period T and having a memory of N symbols and a memory duration of NT; said feedforward filter having a transmission function $W(f)$ which is a function of frequency f and which has an magnitude $|W(f)|$, the magnitude of the transmission function increasing with frequency from a value $|W(o)|$ to a maximum value $|W(f_m)|$ at a frequency $f_m$ and decreasing with increasing frequency higher than $f_m$, wherein the frequency $f_m$ at which the maximum magnitude of the transmission function occurs is related to the symbol memory of said decision feedback equalizer by $f_m 1/((N+1)T)$, and said feedforward filter having a substantially minimum-phase characteristic.

* * * * *